(12) United States Patent
Koshio et al.

(10) Patent No.: US 8,087,140 B2
(45) Date of Patent: Jan. 3, 2012

(54) OPTICAL MEMBER JOINING METHOD AND APPARATUS

(75) Inventors: Satoru Koshio, Ibaraki (JP); Kazuo Kitada, Ibaraki (JP); Tomokazu Yura, Ibaraki (JP); Takuya Nakazono, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 12/936,525

(22) PCT Filed: Apr. 6, 2009

(86) PCT No.: PCT/JP2009/001593
§ 371 (c)(1),
(2), (4) Date: Oct. 6, 2010

(87) PCT Pub. No.: WO2009/125574
PCT Pub. Date: Oct. 15, 2009

(65) Prior Publication Data
US 2011/0047775 A1  Mar. 3, 2011

(30) Foreign Application Priority Data

Apr. 7, 2008 (JP) ................................. 2008-099620
Apr. 6, 2009 (JP) ................................. 2009-091698

(51) Int. Cl.
*B21D 39/00* (2006.01)
*B32B 41/00* (2006.01)

(52) U.S. Cl. ........ 29/417; 29/407.05; 29/407.1; 29/430; 29/709; 29/711; 29/743; 29/783; 29/787; 29/791; 29/795; 156/64; 156/351

(58) Field of Classification Search ............... 29/407.01, 29/407.04, 407.05, 407.09, 407.1, 417, 424, 29/430, 709, 710, 711, 743, 783, 786, 787, 29/791, 793, 795; 156/64, 351
See application file for complete search history.

(56) References Cited

U.S. PATENT DOCUMENTS

| 2003/0223030 A1* | 12/2003 | Byun et al. .................... 349/187 |
| 2005/0016670 A1 | 1/2005 | Kanbara et al. |
| 2005/0199337 A1* | 9/2005 | Nishikubo et al. ............ 156/247 |
| 2006/0011304 A1* | 1/2006 | Nung ............................ 156/538 |
| 2006/0124248 A1 | 6/2006 | Kanbara et al. |
| 2009/0159175 A1 | 6/2009 | Nakahira et al. |

FOREIGN PATENT DOCUMENTS

| JP | 2001-89013 A | 4/2001 |
| JP | 2005-37416 A | 2/2005 |
| JP | 2005-37418 A | 2/2005 |
| JP | 2007-140046 A | 6/2007 |

OTHER PUBLICATIONS

International Search Report for the Application No. PCT/JP2009,1001593 mailed Jun. 30, 2009.

* cited by examiner

*Primary Examiner* — Jermie Cozart
(74) *Attorney, Agent, or Firm* — Cheng Law Group, PLLC (57) ABSTRACT

A processing speed of each mechanisms in a cutting section is controlled such that all polarizing films housed in a container in advance are used in a joining process and simultaneously a new container with polarizing films housed therein that are cut by a size of a liquid crystal panel is loaded from the cutting section. Here, a fracture included in the polarizing film is cut and removed in the cutting section while a delayed time due to this process is shortened by controlling at least a processing speed in a processing mechanism in a cutting mechanism among mechanisms provided in the cutting section and the joining section.

20 Claims, 8 Drawing Sheets

OPTICAL MEMBER JOINING METHOD AND APPARATUS

TECHNICAL FIELD

This invention relates to an optical member joining method and apparatus using thereof for joining an optical member, such as a polarization film, a luminance improving film, and a phase difference film, to a liquid crystal panel automatically with high speed and sufficient accuracy.

BACKGROUND ART

An optical member is conventionally joined to a substrate as follows. Two or more glass substrates, such as an LCD, are successively transported at a given pitch in a horizontal direction. A strip-shaped polarization film is fed out and transported from a feed roll placed above a transportation path of the glass substrate. The polarizing film and an adhesive layer thereof are cut in a width direction perpendicular to a traveling direction in accordance with a length of the glass substrate in the traveling direction while a separation film joined to the adhesive layer of the polarizing film is left in the polarizing film transportation process. Thereafter, a piece of the polarizing film joint to the separation film is removed from the separation film by a separating device immediately before reaching a joining position to the glass substrate. The piece of the polarizing film is then aligned such that a cutting end face thereof in the traveling direction is parallel to an end face of the glass substrate in the traveling direction. The piece of the polarizing film fed out from an upper portion of the glass substrate is joined to the glass substrate while a roller as a joining device presses the piece of the polarizing film (see Patent Literature 1.)

[Patent Literature 1]
Japanese Patent Publication No. 2005-37416

DISCLOSURE OF THE INVENTION

Problem to be Solved by the Invention

However, the conventional embodiment of such a construction has the following drawback. That is, in the foregoing conventional apparatus, when a fracture or contamination is included in the strip-shaped polarizing film, it cannot be automatically removed during a cutting process thereof. Moreover, if an operator tries to remove a defective with a fracture, etc., in the cutting process upstream, the cutting process has to be temporarily suspended. This suspension may lead to a problem that a joining process downstream also has to be suspended.

Moreover, there arises such a disadvantage that, when the polarizing film is completely exhausted from a master roll, the apparatus has to be entirely suspended until the master roll is exchanged for a new master roll.

This invention has been made regarding the state of the art noted above, and its primary object is to provide an optical member joining method and apparatus using thereof that is capable of joining an optical member to a substrate automatically and efficiently.

Means for Solving the Problem

This invention is constituted as stated below to achieve the above object. A first disclosure relates to an optical member joining method for joining an optical member to a liquid crystal panel. The method includes the steps of: feeding out the strip-shaped optical member, and cutting the optical member at a given distance in a transportation direction for housing thereof into a container; unloading the container with the optical member housed therein and loading an empty container to the cutting section; pulling out and transporting the optical member from an unloading region of the container with the optical member housed therein, and joining the optical member to at least one surface of the liquid crystal panel in a given joining position. In the joining step, at least one of the containers with the optical member housed therein is loaded to the joining section prior to pulling out of all the optical members from the container.

In loading of the container with the optical members housed therein to the joining step, all the optical members housed in the container may be pulled out and the empty container is unloaded in the joining step. Simultaneously, the container with the cut optical members housed therein in the cutting step is loaded to an optical member pulling out position at the unloading region.

(Effect) According to the method of this invention, the container with a given number of optical members housed therein is loaded to the optical member pulling out position in the joining section before the container has no stock of the optical members to be treated in the joining section. Therefore, a series of processes from cutting of the optical member to joining of the optical member to the liquid panel may be successively performed with no suspension.

A third disclosure according to the first or second disclosure includes the cutting step further having the steps of detecting a fracture in the optical member and cutting and removing the fracture.

(Effect) According to the method of this invention, the fracture in the optical member may automatically be removed during the cutting step. Consequently, a reduced period of time for loading the optical member from the cutting section to the joining section may be obtained.

In the foregoing method, a timing of unloading the empty container from the joining step and a timing of loading the container with the optical members housed therein may be controlled as following. For instance, a temporary unit time is determined for pulling out all the optical members from inside of the container in the joining section. A processing time is controlled from cutting and housing of the optical member fed out from the master roll in the cutting section by a given number to loading of the container to the optical member pulling out position as the unloading region Here, the processing time is controlled, for example, by calculating in advance a reference incidence of fracture in the strip-shaped optical member having a given length and determining a shortest time required for cutting and removing the fracture and for housing the optical members in the container; and controlling at least one of a carrying speed of the optical member, a housing speed of the optical member, and a loading speed of the container within a remaining period of time that is given by subtracting the shortest time from the unit time in the joining step.

According to the method, a successive process may be performed while maintaining a constant period of time for joining the optical member to the liquid crystal panel in the joining section.

Moreover, in the inspecting step in the foregoing method, the reference incidence of fracture determined in advance is compared with an actual incidence of fracture as a ratio of the fracture determined in sequence in the strip-shaped optical member of a given length. Where the actual incidence exceeds the reference incidence, at least one of the carrying speed of the optical member, the housing speed of the optical member, the loading speed of the container, and the fracture removal speed reaches a limiting value in the cutting step, the loading time to the optical member pulling out position exceeds the unit time, and the carrying speed of the optical member in the joining section may be controlled such that the unit time is equal to the loading time.

According to this method, even when the actual incidence of fracture in the optical member exceeds the reference incidence in the cutting step, and an actual processing time in the cutting step exceeds the unit time determined in advance, the processing speed on a joining section side may be controlled and the unit time may be changed to a period of time to be delayed in the cutting step.

As a result, a container with new optical members housed therein is loaded to the optical member pulling out position at the same time that the container loaded in the optical member pulling out position has no stock of the optical members. Thus, a series of processes from cutting of the optical member to joining of the optical member to the liquid crystal panel is never suspended. Here, when the actual incidence greatly exceeds the reference incidence, an abnormal condition is confirmed and a series of processes is to be suspended.

A seventh disclosure relates to an optical member joining method for joining an optical member to a liquid crystal panel. The method includes the steps of feeding out the strip-shaped optical member having a separator, cutting the optical member at a given distance in a transportation direction, and housing the optical member into a container; unloading the container with the optical member housed therein and loading an empty container to the cutting section; carrying the optical member from an unloading region of the container with the optical members housed therein and separating the separator; and joining the optical member with the separator separated therefrom to at least one surface of the liquid crystal panel in a given joining position. In the separating step, at least one of the containers with the optical member housed therein is loaded from the cutting step to the separation step before all the optical members are carried from the container.

In loading of the container with the optical members housed therein to the joining section, all the optical members housed in the container may be pulled out and the empty container is unloaded in the separating section. Simultaneously, the container with the cut optical members housed therein in the cutting section is loaded to the optical member pulling out position at the unloading region.

(Effect) According to the method of this invention, the container with a given number of optical members housed therein is loaded to the optical member pulling out position in the joining section before the container has no stock of the optical members to be treated in the joining section. Therefore, a series of processes from cutting of the optical member and separating of the separator to joining of the optical member with the separator separated therefrom to the liquid crystal panel may be successively performed with no suspension.

A eighth disclosure includes the cutting step according to the seventh disclosure further having the steps of separating the separator from the optical member; detecting a fracture in the optical member with the separator separated therefrom; joining a separator to the optical member subjected to detection; and cutting and removing the fracture.

(Effect) According to the method of this disclosure, the fracture in the optical member may automatically be removed during the cutting step. Consequently, a reduced period of time for loading the optical member from the cutting section to the joining section may be obtained.

In the foregoing method, a timing of unloading the empty container from the joining section and a timing of loading the container with the optical members housed therein may be controlled as following. For instance, a temporary unit time is determined for pulling out all the optical members from inside of the container in the joining step. The optical member is cut in the cutting step to be housed by a given number. Then, a processing time before loading the container to the optical member pulling out position as the unloading region is controlled.

Here, the processing time is controlled, for example, by calculating in advance a reference incidence of fracture in the strip-shaped optical member having a given length and determining a shortest time required for cutting and removing the fracture; and controlling at least one of a carrying speed of the optical member, a housing speed of the optical member, and a loading speed of the container within a remaining period of time that is given by subtracting the shortest time from the unit time in the joining step.

According to the method, a successive process may be performed while maintaining a constant period of time for joining the optical member to the liquid crystal panel in the joining section with no suspension of cutting, separating, and joining processes.

Moreover, in the detecting step in the foregoing method, the reference incidence of fracture determined in advance is compared with an actual incidence of fracture determined in sequence. Where the actual incidence exceeds the reference incidence, at least one of the carrying speed of the optical member, the housing speed of the optical member, and the loading speed of the container, the joining speed of the separator, and the fracture removal speed reaches a limiting value in the cutting step, and the loading time to the optical member pulling out position exceeds the unit time, the carrying speed of the optical member in the joining step may be controlled such that the unit time is equal to the loading time.

According to this method, even when the actual incidence of fracture in the optical member exceeds the reference incidence, and an actual processing time in the cutting process exceeds the unit time determined in advance, the processing speed on separating section and joining section sides may be controlled and the unit time may be changed to a period of time to be longer in the cutting step.

As a result, a container with new optical members housed therein is loaded to the optical member pulling out position at the same time that the container loaded in the optical member pulling out position has no stock of the optical members. Thus, a series of processes from cutting of the optical member to joining of the optical member to the liquid crystal panel is never suspended.

A thirteenth disclosure relates to optical member joining apparatus that joins an optical member to a liquid crystal panel. The apparatus includes an optical member supply device that supplies the strip-shaped optical member; a cutting device that cuts the optical member at a given distance in a feeding direction; a container that houses cut optical members; a housing device that houses the cut optical members into the container; a loading device that loads the container to an optical member pulling out position where the optical member is joined to the liquid crystal panel; a carrying mechanism that pulls out the optical member from the container; a joining device that joins the optical member carried and transported with the carrying mechanism to the liquid crystal panel; an unloading device that unloads an empty container from which the optical members are pulled out with the carrying mechanism; and a control device that controls at least one of a carrying speed of the optical member from the optical member supply device, a housing speed that houses the optical member into the container with the housing device, and a loading speed of the container with the loading device such that the container with the cut optical members housed therein is loaded to the optical member pulling out position at the same time that all the optical members are pulled out from the container loaded into the optical member pulling out position and the empty container is unloaded.

(Effect) With this configuration, the foregoing method of the first disclosure may suitably be performed.

A seventeenth disclosure relates to optical member joining apparatus that joins an optical member to a liquid crystal panel. The apparatus includes an optical member supply device that feeds out and supplies the strip-shaped optical member having a separator; a cutting device that cuts the optical member at a given distance in a feeding direction; a container that houses cut optical members; a housing device that houses the cut optical members into the container; a loading device that loads the container to an optical member pulling out position where the optical member is joined to the liquid crystal panel; a carrying mechanism that pulled out the optical member from the container; a separating device that separates the separator from the optical member pulled out and unloaded by the unloading mechanism; a joining device that joins the optical member with the separator separated therefrom to the liquid crystal panel; an unloading device that unloads an empty container from which the optical members are carried with the carrying mechanism; and a control device that controls at least one of a carrying speed of the optical member from the optical member supply device, a housing speed that houses the optical member into the container with the housing device, and a loading speed of the container with the loading device such that the container with the cut optical members housed therein is loaded to the optical member pulling out position at the same time that all the optical members are carried from the container loaded into the optical member pulling out position and the empty container is unloaded.

(Effect) With this configuration, the foregoing method of the seventh disclosure may suitably be performed.

Effect of the Invention

According to the optical member joining method and apparatus of this invention, a successive process may be performed with no process being suspended from cutting of the fed out and supplied strip-shaped optical member at a given distance to joining of the optical member to at least one surface of the liquid crystal panel.

DESCRIPTION OF REFERENCES

1 . . . film supply portion
2 . . . inspection device
3 . . . cutting mechanism
4 . . . collecting mechanism
5 . . . container
6 . . . carrying mechanism
9 . . . controller
17 . . . loading mechanism
18 . . . separating mechanism
19, 20 . . . transportation belt
21 . . . joining mechanism
22 . . . inspection device
23 . . . distinction mechanism
F . . . polarizing film
S . . . separator
T . . . separation tape
W . . . liquid crystal panel

BEST MODE FOR CARRYING OUT THE INVENTION

One exemplary embodiment of this invention will be described in detail hereinafter with reference to the drawings. The optical member in this invention is not particularly limited as long as it is a strip-shaped functional film, such as a polarizing film, a phase difference film, and a luminance improving film, which has flexibility. This embodiment will be described, taking a case as one example where a polarizing film is joined to a liquid crystal panel.

Figure 1:
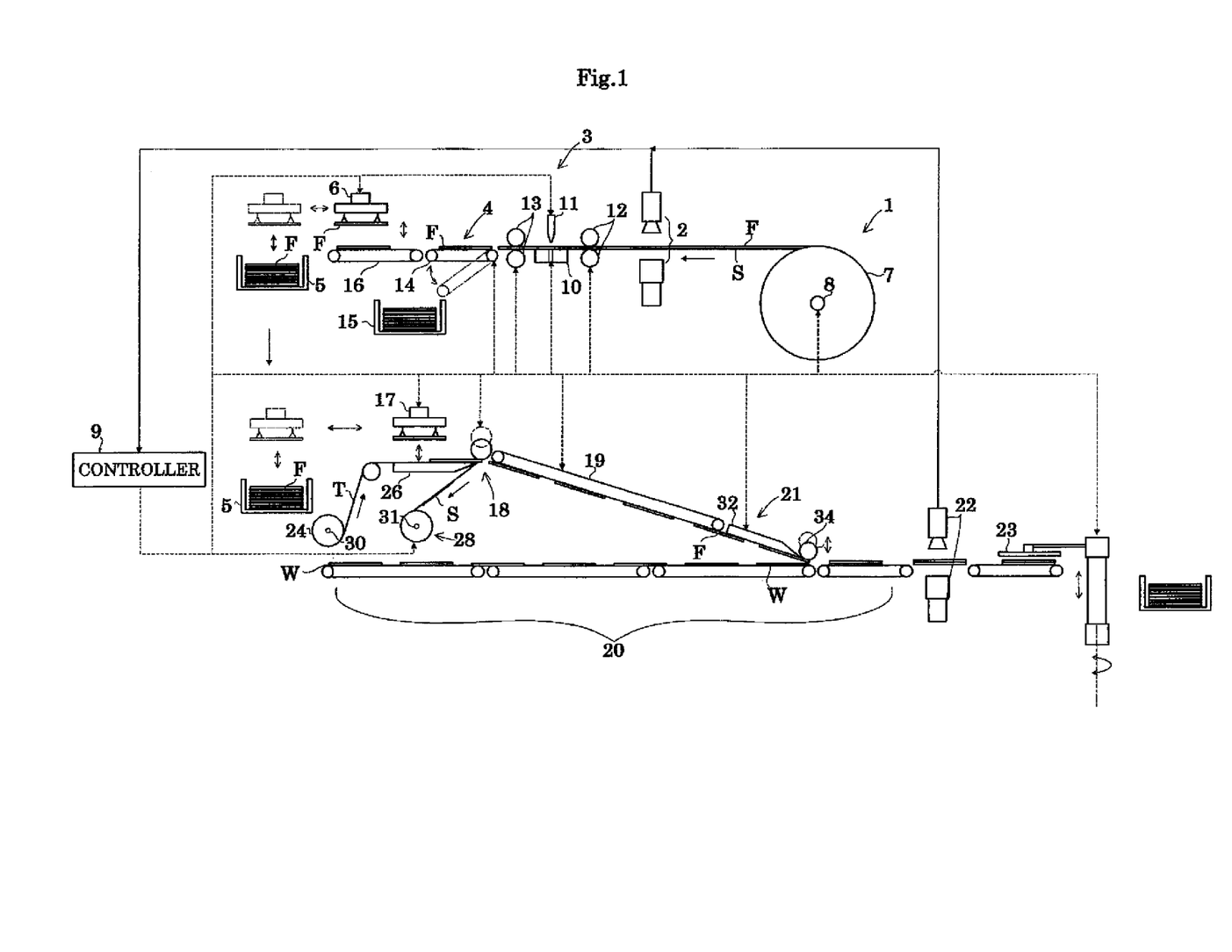
FIG. 1 is a side view showing a general configuration of optical member joining apparatus.

FIG. 1 shows a schematic configuration of optical member joining apparatus that performs an optical member joining method according to this invention.

As shown in FIG. 1, the apparatus of this embodiment has a cutting section from cutting of a strip-shaped polarizing film F at a given distance to housing it into a container, a joining section of joining the cut polarizing film F to a liquid crystal panel W, and a loading device that carries the container from the cutting section to the joining section.

As shown in FIG. 1, the cutting section has a film supply portion 1 that feed outs and supplies the polarizing film F having a separator S on an adhesive surface thereof, an inspection device 2 that conducts appearance inspection of the polarizing film F, a cutting mechanism 3 that cuts the polarizing film F by a given length in a transportation direction, a collecting mechanism 4 that removes a fracture detected through the appearance inspection, and a carrying mechanism 6 that carries and houses non-defective polarizing films F into a container 5 in a stack manner at a terminal of a transportation path. Here, the film supply portion 1 corresponds to the optical member supply device of this invention, the inspection device 2 to the inspection device, the cutting mechanism 3 to the cutting device, the carrying mechanism 6 to the housing device, and the collecting mechanism 4 to the removal device, respectively.

The film supply portion 1 has a master roll 7 with a bobbin 8 loaded therein in a roll form of a strip-shaped polarizing film F that is made through slit of the wider polarizing film by a given dimension. The bobbin 8 is connected to a drive, such as a motor.

The inspection device 2 detects failure, such as fracture in the polarizing film F or contamination that adheres or exists on its surface or inside thereof. This embodiment adopts a CCD camera of optical system. For instance, the CCD camera is placed above the polarizing film F, and a lighting device below the polarizing film F such that both sandwich the polarizing film F. With this configuration, light is applied to the polarizing film F from below, whereby the polarizing film F with light passing therethrough is imaged with the CCD camera continuously or intermittently. The image resultant is converted into a digital signal, and transmitted to a controller 9, mentioned later. Thereafter, a computing section in the controller 9 performs a matching process with a reference image acquired from the same reference sample as an object of inspection to detect the fracture in the polarizing film F or contamination adhering thereon.

The cutting mechanism 3 includes a holding table 10 that suction-holds a rear face of the polarizing film F, a laser device 11, and a pair of nip rollers 11 and 12 that are disposed on upstream and downstream sides of the laser device 11, respectively, with the laser device 11 located therebetween to nip the polarizing film F.

The holding table 10 has a suction groove formed therein in a scanning direction of laser light emitted from the laser device 11. That is, the groove is formed in a width direction perpendicular to the transportation direction of the polarizing film F.

The laser device 11 is movable horizontally so as to cut the polarizing film F in the width direction.

The nip roller 12 and 13 include lower drive rollers disposed in a fixed manner so as to feed out the polarizing film F, and rollers that nip the polarizing film F in cooperation with the drive rollers.

The collecting mechanism 4 has a transport conveyor 14 provided with a transport belt for transporting the polarizing film F fed out from the nip roller 13, and a collection receptor 15 housed below the transport conveyor 14.

The transport conveyor 14 is formed such that an idle roller on a front end side may swing downward via a driving roller on the upstream side as a supporting point. With this downward swing, the polarizing film F on the transport belt in an obliquely inclined downward is slidingly moved downward to be collected in the collection receptor 15 on the lower side.

A transport conveyor 16 is provided that is continued to the transport conveyor 14 in the collecting mechanism 4 for conveying a non-defective polarizing film F to a delivering position to the container 5.

The carrying mechanism 6 has a suction hole formed on the rear face thereof that suction-holds a surface of the polarizing film F. The carrying mechanism 6 may reciprocate and move vertically between the delivering position of the polarizing film F on the transport conveyor 16 and an opening for collecting the container 5.

It is to be noted that the container 5 is held on the transport mechanism, such as the transport roller or the transport belt, that connects from a housing position of the polarizing film F in the cutting section to the delivery position in the joining section (the optical member pulling out position.)

The joining section has a carrying mechanism 17 that suction-holds an uppermost polarizing film F housed in the container 5 loaded in the optical member pulling out position and carries it to a separating mechanism 18, a transport belt 19 that transports the polarizing film F towards a joining position to the liquid crystal panel W, a transport belt 20 that transports the liquid crystal panel W subjected to a surface grinding and a cleaning treatment to the joining position, a joining mechanism 21 that joins the polarizing film F to the liquid crystal panel W, an inspection device 22 that conducts appearance inspection of the liquid crystal panel W with the polarizing film F applied thereon, and a distinction mechanism 23 that distinguishes the non-defective from the defective based on the inspection result. Here, the carrying mechanism 17 corresponds to the carrying mechanism of this invention, and the separating mechanism 18 to the separating device, respectively.

The carrying mechanism 17 has a suction hole formed on the rear face thereof that suction-holds a surface of the polarizing film F. The carrying mechanism 17 may reciprocate and move horizontally and vertically between the pulling out position in the opening for collecting the container 5 and the delivering position of the separating mechanism 18.

The separating mechanism 18 has a separation tape supply mechanism that feeds outs and supplies a separation tape T wound around a master roll 24, a separation table 26 provided with an edge that winds around and folds back the supplied separation tape T at a tip end thereof, and a separator collecting mechanism 28 that collects the separator S separated with the edge.

The transport belt 19 has two or more minute holes formed on the surface thereof. The transport belt 19 suction-holds on its surface a surface as a non-adhesive surface of the polarizing film F with the separator S separated therefrom in the separating mechanism 18, and transports it to the joining mechanism 21.

A bobbin 30 is loaded with the master roll 24, and proper resistance is applied for prevention from inverse rotation.

The separation table 26 folds back the separation tape T joined to the polarizing film F with the edge at the front end thereof and the separation tape T is wound up. Consequently, the separator S is integrally separated from the polarizing film F. Here, the surface of the separation table 26 is subjected to a releasing treatment.

The separator collecting mechanism 28 has a bobbin 31 that winds up the separator S, and a rotary mechanism, such as a motor, is coupled to the bobbin 31.

The joining mechanism 21 has a suction table 32 that transports while suction-holding the surface of the polarizing film F fed out from the transport belt 19, a supply mechanism 33 that supplies the polarizing film F towards a front end of the surface of the liquid crystal panel W in the transportation direction, a joining roller 34 that pressing and joining the polarizing film F to the liquid crystal panel W, and a photo sensor, not shown, formed of a CCD camera, etc., that detects the joining position of the liquid crystal panel W and the polarizing film F.

Figure 7:
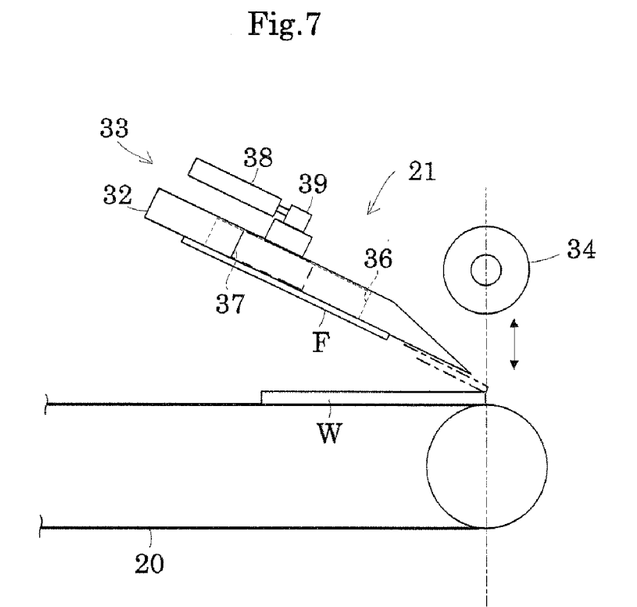
FIGS. 7 and 8 each shows a joining operation of a polarizing film.

As shown in FIG. 7, the supply mechanism 33 has a table that is inclined obliquely downward toward the liquid crystal panel W to be transported horizontally. The table has a long hole 36 formed from a center towards a front end thereof. A suction member 37 is provided in the long hole 36 that is appropriately flush with the surface of the table and capable of moving therein. A piston rod 39 of an air cylinder 38 is coupled to an upstream end of the suction member 37 at a front end thereof. That is, when the piston rod 39 is ejected by operation of the air cylinder 38, the suction member 37 that suction-holds around the center of the rear face of the polarizing film F moves forward. With the movement, the front end of the polarizing film F projects from the front end of the table to be transported to the joining position to the liquid crystal panel W.

The joining roller 34 moves vertically from a standby position above a reference position of joining the front end of the polarizing film F to the liquid crystal panel W to the joining position on the lower side.

The inspection device 22 detects defect such as fracture of the liquid crystal panel W with the polarizing film F applied thereon or contamination that adhere or exist on the surface or inside of the liquid crystal panel W. In this embodiment, a CCD camera of optical system and a lighting device are utilized similar to the inspection device 2 in the cutting section.

The distinction mechanism 23 has a robot arm that conveys the non-defective liquid crystal panel W and the defective liquid crystal panel W to an individual collecting position.

Description of the controller 9 will be given later in explanation on operations of the apparatus described above.

The above description is about the configurations and functions of the main components of the optical member joining apparatus according to this invention. Next, description will be given of procedures with this apparatus from cutting of the strip-shaped polarizing film F to joining thereof to the liquid crystal panel W with reference to the flow chart shown in FIG. 2.

<Step S1> Initial Value Input

Figure 2:
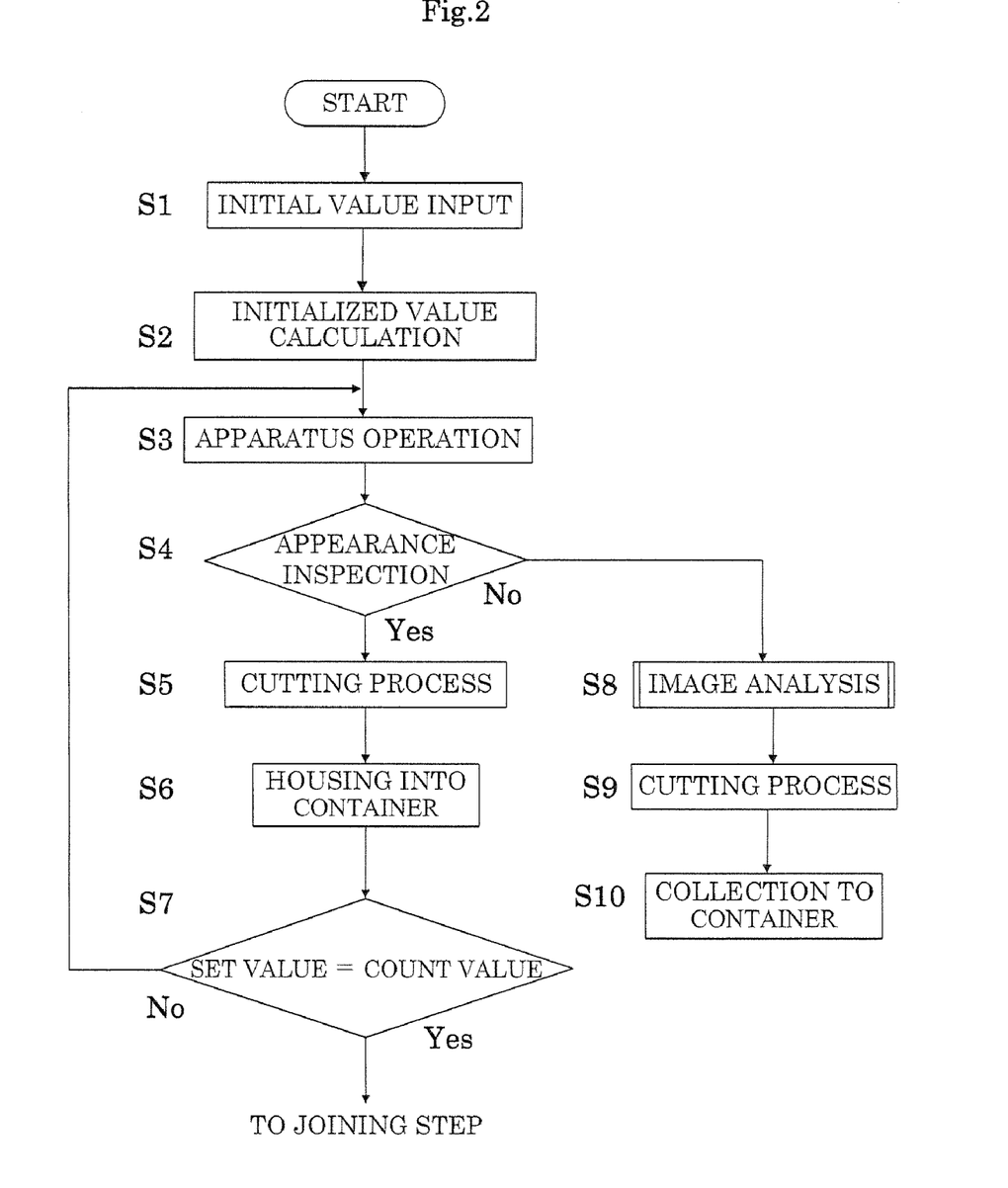
FIG. 2 is a flow chart showing operations of a cutting section according to Embodiment 1.

First, the film supply unit 1 is loaded with a master roll 7 of a polarizing film F to be used herein. A liquid crystal panel W is loaded in a supply position. After completion of the loading, an operator conducts initial settings by use of an operation panel and the like. For instant, settings are inputted such as a size of the liquid crystal panel W, a length of the polarizing film F of the master roll 7, a reference incidence of fracture determined in advance through examinations, etc., using a sample of the same polarizing film F, and a number of the polarizing films F housed in the container 5. Here, it is assumed, for example, that a unit length is a length of the polarizing films F by the number that may be housed in the container 5. Where the fracture included in the detected sample in the unit length is removed, the reference incidence is determined from a ratio of the unit length and an additional length required for obtaining a given number of the polarizing films.

<Step S2> Initialized Value Calculation

The controller 9 calculates a unit time in accordance with the settings input by the operator from pulling out of the polarizing film F in the container 5 that is loaded to the optical member pulling out position in the joining section to joining thereof to the liquid crystal panel W and collecting of the polarizing film F. A temporary unit time is determined for pulling out a given number of the polarizing films F in the container based on the unit time.

Thereafter, the controller 9 calculates a processing time from housing of the given number of the polarizing films F into the container 5 to loading thereof to the optical member pulling out position. In this embodiment, determination is performed on a reference incidence of fracture included in the loaded strip-shaped polarizing film F and a shortest time where it is assumed that the fracture is cut and removed. Control is performed of at least one of a carrying speed of the polarizing film F, a housing speed to the container 5, and a loading speed of the container 5 within a remaining period of time that is given by subtracting the shortest time from the unit time in the joining step to perform a computing process such that the processing time is equal to the unit time. Where there are two or more devices that perform either the cutting process or the joining process, a computing process is performed such that a total processing time of the devices for performing each process is equal to a total unit time. For instance, where there are five devices that function as the joining section with respect to one decide that functions as the cutting section, when each of the joining devices is set in the same unit time, control is made by calculation of the processing time to as to be the processing time≈the unit time×5.

<Step S3> Apparatus Operation

When the computing process is completed and a processing speed of each mechanism in the cutting and joining sections is determined, the polarizing film F starts to be supplied from the master roll 7.

<Step S4> Appearance Inspection

When the polarizing film F is supplied, the inspection device 2 conducts appearance inspection. Where fracture is detected, detection image data is transmitted to the controller 9. Where no fracture is detected, the process proceeds to Step S5. Where fracture is detected, the process proceeds to Step S8.

<Step S5> Cutting Process

In the cutting mechanism 3, the polarizing film F is transported to the cutting position with a given pitch corresponding to the size of the liquid crystal panel W. When alignment is determined, feed of the polarizing film F is temporarily suspended. Here, the nip rollers 12 and 13 nip the polarizing film F. Subsequently, the holding table 10 suction-holds the rear face of the polarizing film F. When the polarizing film F is held, the laser device 11 scans and cuts the polarizing film F in the width direction thereof. When the cutting is completed, the holding table 10 releases its suction, and drive rollers operate while the nip rollers 12 and 13 perform nipping. With this operation, the cut polarizing film F is transported to the transport conveyor 14, and a new polarizing film F to be cut is conveyed into the cutting operation position.

<Step S6> Housing into Container

When conveying the polarizing film F to the delivering position, the transport conveyor 14 temporarily stops, and the carrying mechanism 6 in the upper standby position moves downward to suction-hold the surface of the polarizing film F. When suction-holding is completed, the carrying mechanism 6 moves upward to carry the polarizing film F into the container 5.

<Step S7> Set Value=Count Value

The number of the polarizing films F is counted that are housed in the container 5. When a count value reaches the set value of the given number set in advance, the container 5 is unloaded and a new empty container 5 is loaded. Where a count value never reaches the set value, the processes subsequent to the foregoing Step S3 are to be repeated.

Next, description will be given of a case where fracture is detected in Step S4.

<Step S8> Image Analysis

The controller 9 conducts image analysis with image signals from the inspection device 2 for determining a feed length of a portion including the fracture. Information on the length is sent to each mechanism, such as the cutting mechanism 3 and the film supply portion 1 in the cutting section. Simultaneously, the controller 9 performs computing processes subsequent to Step S11 shown in FIG. 3, which processes are to be mentioned later.

<Step S9> Cutting Process

The polarizing film F is fed out from the film supply portion 1 to the cutting mechanism 3 by a length from which the fracture may be removed, and then stops temporarily. Here, the polarizing film F is nipped and the rear face thereof is suction-held. Thereafter, the polarizing film F is cut. After the cutting, the suction of the polarizing film F is released, and the drive rollers of the nip rollers 12 and 13 operate for feeding out the polarizing film F.

<Step S10> Collection to Container

When the polarizing film F including the fracture from the cutting mechanism 3 is placed on the transport conveyor 14 of the collecting mechanism 4, the front end of the transport conveyor 14 swings downward. Accordingly, the polarizing film F slides on a slope to be housed in the collecting container 15.

<Step S11> Reference Incidence <Actual Incidence

Figure 3:
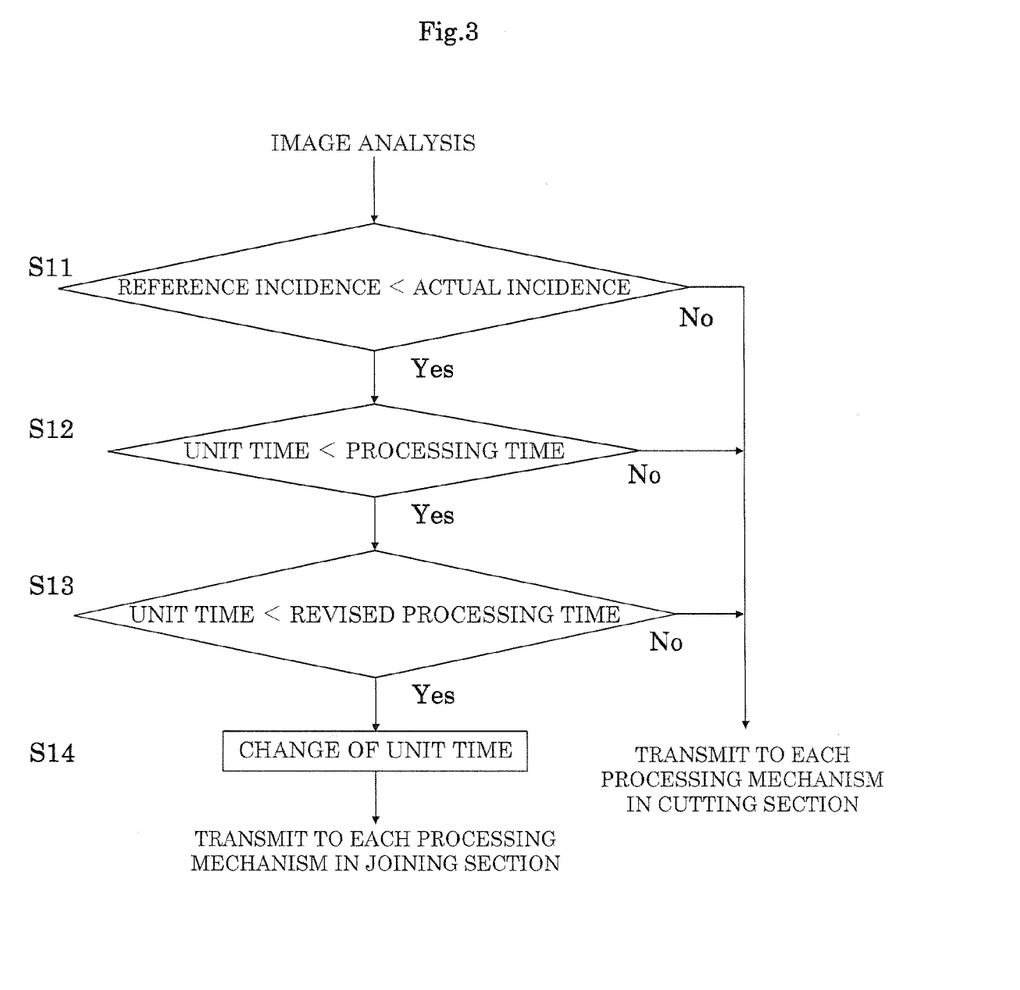
FIG. 3 is a flow chart of a calculating process with image analysis shown in FIG. 2.

The count value of the fracture detected with the inspection device 2 is added to the shortest length for cutting and removing the fracture that is determined through the image analysis. The added length is used for determining the actual incidence. Thereafter, comparison is made of the actual incidence and the reference incidence. As a result of the comparison, where the actual incidence never exceeds the reference incidence, the cutting process is performed under the state as it is. Where the actual incidence exceeds the reference incidence, the process proceeds to Step S12.

<Step S12> Unit Time <Processing Time

Next, when the actual incidence exceeds the reference incidence, the controller 9 adds a processing time for collecting the fracture to the processing time determined in advance. Here, a comparison computation process is performed whether or not the processing time including the time for removing the fracture with the reference incidence determined in advance from filling of the container 5 with the polarizing films F to loading of the container 5 to the joining section exceeds the unit time. As a result of the comparison, where the processing time never exceeds the unit time, the cutting process is performed under the state as it is. Where the processing time exceeds the unit time, the process proceeds to Step S13.

<Step S13> Unit Time <Revised Processing Time

The controller 9 controls each processing speed of the mechanisms in the cutting section as to shorten a time that the processing time exceeds the unit time. For instance, the following simulation is performed. The processing speed of each mechanism is controlled so as to be not more than the limiting value such that a timing of cutting the polarizing film F is identical to a timing of conveying the cut polarizing film F into the container 5. In other words, the processing speed of each mechanism is increased and an exceeded portion thereof is shortened so as to minimize the number of temporary suppression of the entire processes.

When the processing time in the cutting process falls within the unit time by controlling the processing speed of any mechanisms within the limiting value in this simulation, the processing speed of each mechanism is changed so as to meet setting conditions required for the above processing time. As a result of the simulation, where at least one of the mechanisms has the processing speed over the limiting value, the process proceeds to Step S14.

<Step S14> Change of Unit Time

The controller 9 meets the unit time in the joining section with the processing time in the cutting section in accordance with the result of the simulation in Step S13 while changing the processing speed of each mechanism in the cutting section into the maximum processing speed that is equal or less than the limiting value and in which no load due to treatment to the polarizing film F is applied.

Figure 4:
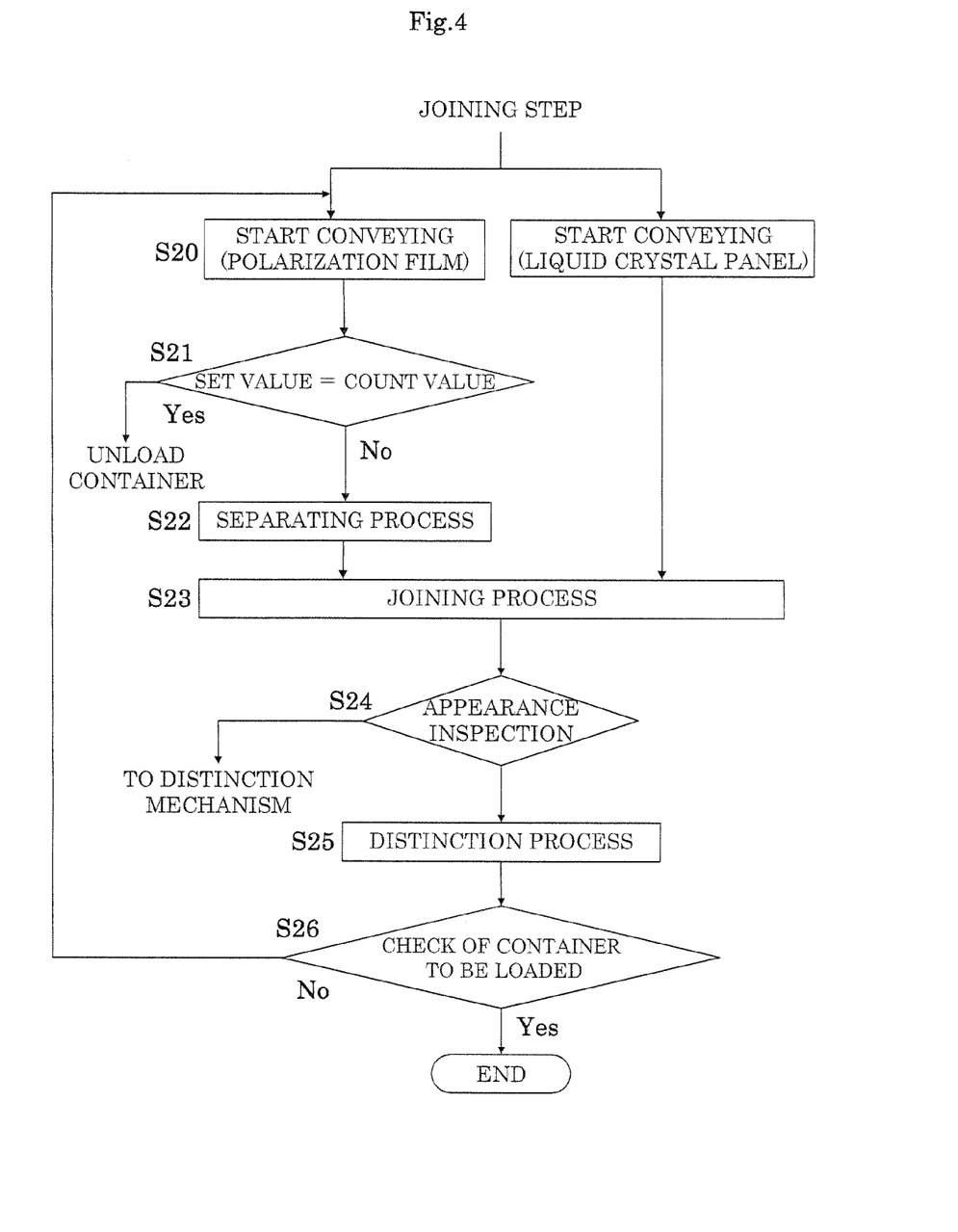
FIG. 4 is a flow chart showing operations of a joining section according to Embodiment 1.

Next, description will be given of a joining process with a flow chart shown in FIG. 4.

<Step S20> Start Conveying

The carrying mechanism 17 moves downward toward the upper opening of the container 5 loaded in the optical member pulling out position to suction-hold the uppermost one of the polarizing film F. Then, the carrying mechanism 17 presses the separation tape T with the adhesive surface thereof that is joined around the separation table 26. Simultaneously, the liquid crystal panel W is placed on the transport belt 20, and transported to the joining position.

<Step S21> Set Value=Count Value

The number of the polarizing films F is counted that are pulled out from the container 5. When the count value reaches the set value of the given number set in advance, the container 5 is unloaded and a new empty container 5 from the cutting section is loaded in the optical member pulling out position. Where the count value never reaches the set value, the processes subsequent to the foregoing Step S3 are to be repeated.

<Step S22> Separating Process

Figure 5:
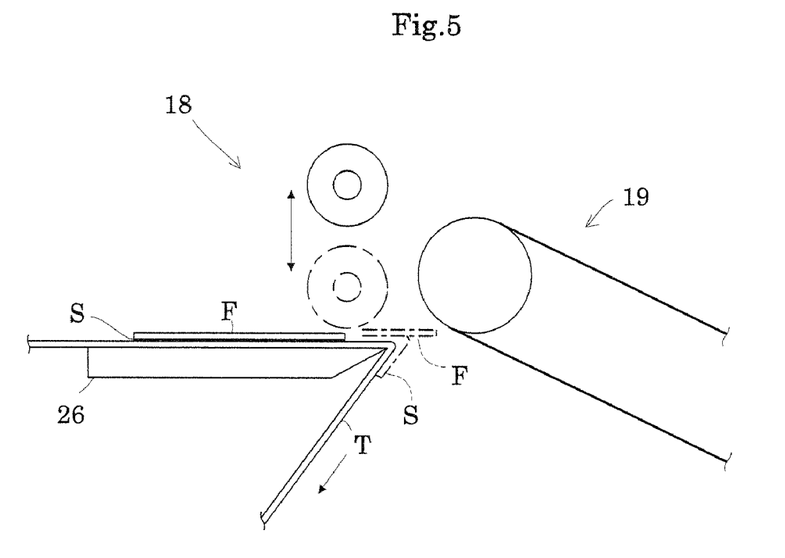
FIGS. 5 and 6 each shows a separating operation of a separator.
Figure 6:
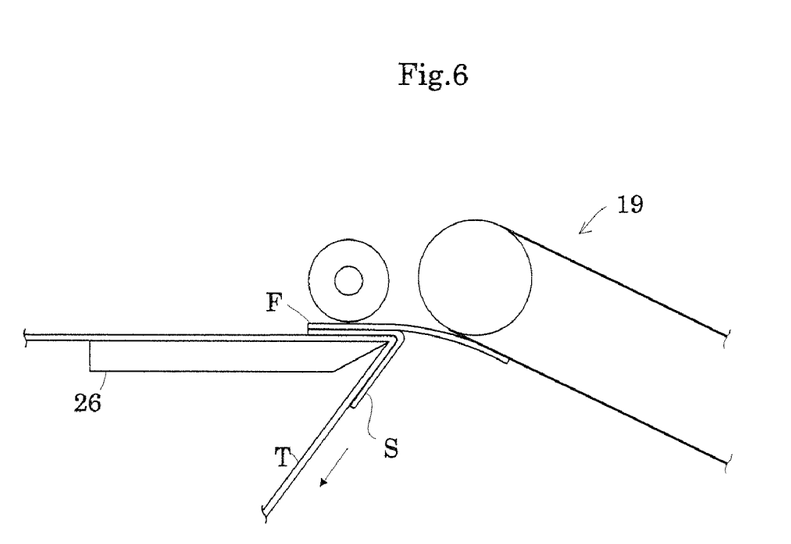

Upon joining of the polarizing film F to the separation tape T, the carrying mechanism 17 moves upward to the delivery position of a next polarizing film F, and the separation tape T is operated to wind up. With the operation, as shown in FIG. 5, as the separation tape is folded back with the edge and is wound up, the separator S is separated from the polarizing film F with the separation tape T joined thereto. The front end of the polarizing film F is fed to the under surface of the transport belt 19. Here, as shown in FIG. 6, the front end of the polarizing film F is suction-held due to suction of the transport belt 19. Moreover, as the transport belt 19 drives at a synchronization speed to the feed speed of the polarizing film F, the entire non-adhesive surface of the polarizing film F is suction-held.

<Step S23> Joining Process

The polarizing film F to be suction-held and transported by the transport belt 19 is fed from the front end thereof so as to be close to the under surface of the suction table 32. Here, the polarizing film F is suction-held when the approximately center thereof reaches the position of the suction member 37 of the supply mechanism 33. In this state, the polarizing film F moves along the slope of the suction table 32 and the front end thereof is fed to the joining position. The transport belt 20 simultaneously transports the liquid crystal panel W to the joining position.

Figure 8:
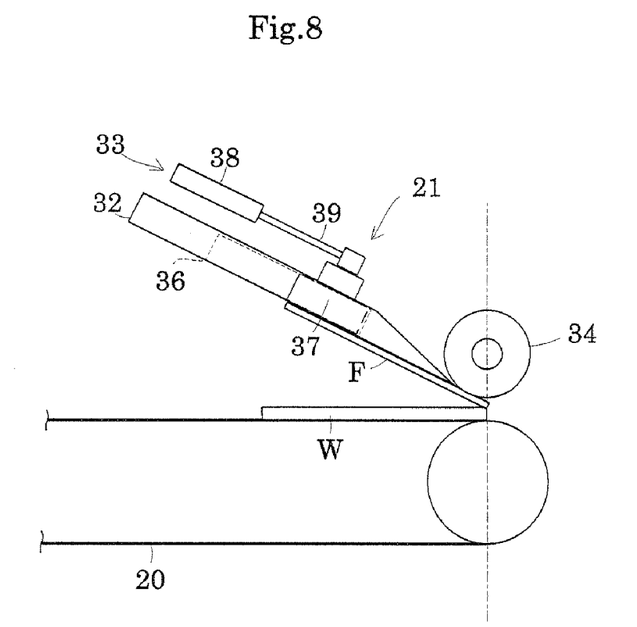

As shown in FIG. 7 by dotted lines, when the optical sensor detects that both the polarizing film F and the liquid crystal panel W reach the joining position, the joining roller 34 moves downward. With the movement, as shown in FIG. 8, the front end of the polarizing film F is joined to the liquid crystal panel W. The polarizing film F and the liquid crystal panel W are fed between the rollers while synchronizing the feed speed of the polarizing film F to the transportation speed of the liquid crystal panel W, whereby the polarizing film F is joined to the entire surface of the liquid crystal panel W.

<Step S24> Appearance Inspection

The liquid crystal panel W with the polarizing film F applied thereon is fed into the inspection device 22, where failure is detected such as fracture or contamination that is joined to the surface thereof or exists therein. Where fracture exists, the detection signal is transmitted to the controller 9.

<Step S25> Distinction Process

The distinction mechanism 23 operates the robot arm in accordance with signals from the controller 9 to convey the non-defective liquid crystal panel W and the defective liquid crystal panel W to a separate collecting position.

<Step S26> Check of Container to be Loaded

Prior to pulling out all the polarizing films F in the container 5 in the optical member pulling out position, a sensor, not shown, detects whether or not a new container 5 has been unloaded from the cutting section. Where the detection signal has been transmitted to the controller 9, the process is to be completed when the polarizing films F loaded in the container 5 at present are used. Where no detection signal is transmitted to the controller 9, the processes subsequent to Step 20 are to be repeated.

As noted above, a series of processes from supplying the strip-shaped polarizing film F to joining thereof to the liquid crystal panel W may be performed without suspension by determining a temporary unit time until pulling out all the polarizing films F of the given number housed in the container 5 in the joining section, and by controlling the container 5 in which the polarizing films F of the given number are newly housed as to load in the joining section from the cutting section during the unit time.

Where fracture is detected in the polarizing film F in the cutting section, the relevant fracture may be cut and removed in the same transport path. Moreover, even when the incidence of fracture is high and the processing time until housing all the polarizing films F in the container 5 in the cutting section exceeds the unit time, the foregoing series of processes is never suspended since the unit time is changed into the processing time in the cutting section. That is, working efficiency may be improved.

Moreover, the fracture may be cut and removed by a minimum length, which results in a reduced disposal amount of the unnecessary portion and enhanced productivity.

The present invention may be embodied in forms modified as described below.

Figure 9:
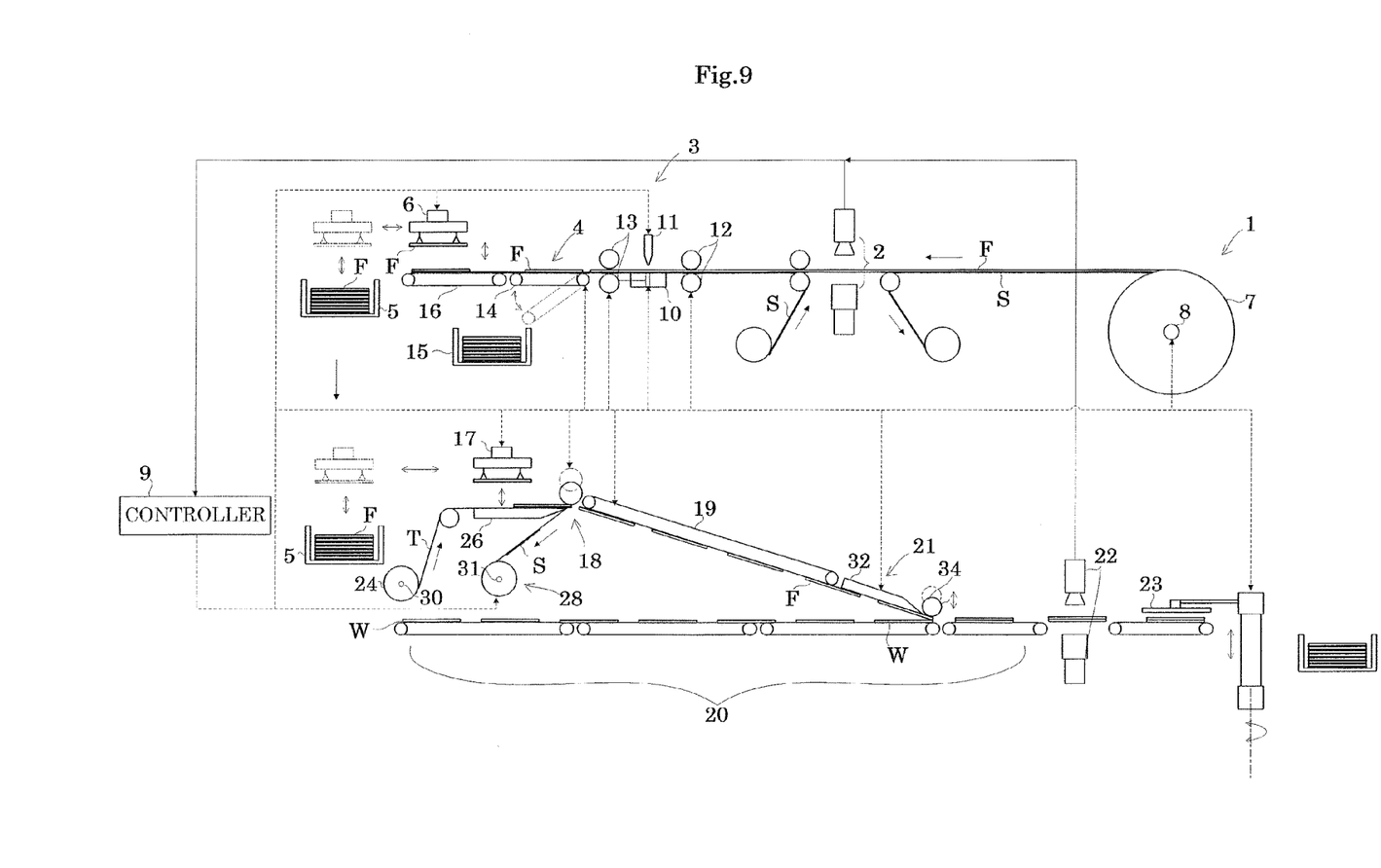
FIG. 9 is a side view showing a general configuration of apparatus according to Modification 1.

(1) In inspecting the polarizing film F in the cutting section of the apparatus in the foregoing embodiments, the separator S may be separated from the rear face of the polarizing film F prior to the inspection, and a new separator S may be supplied to be joined to the rear face of the polarizing film F after the inspection, as shown in FIG. 9.

According to this configuration, variation in orientation angle of the separator S and inspection impediments under influence of reflected light may be eliminated. The defect such as fracture may be detected with high accuracy.

Moreover, the separated separator S may again be joined to the polarizing film F with the separator S already separated therefrom.

Figure 10:
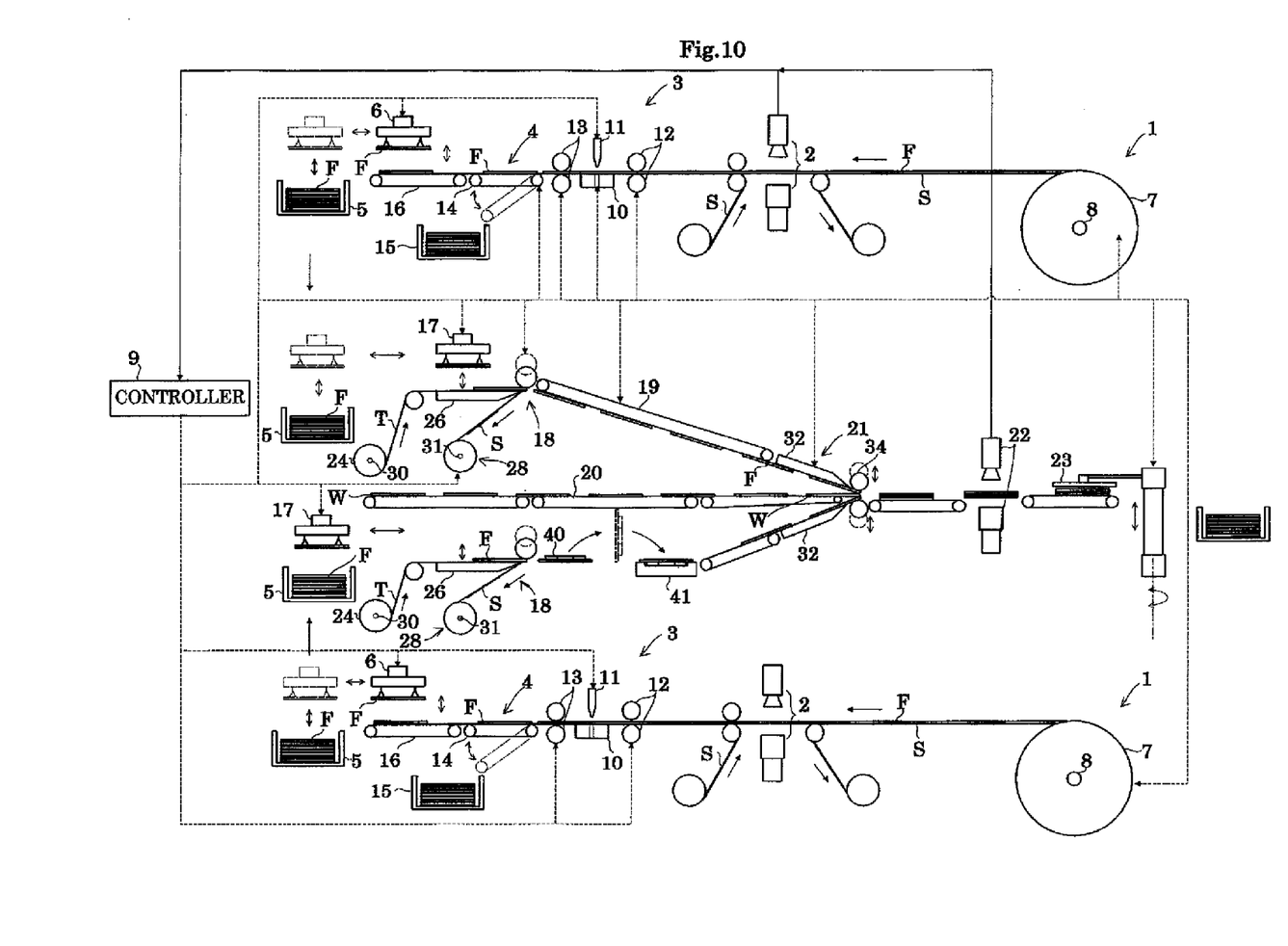
FIG. 10 is a side view showing a general configuration of apparatus according to Modification 2.

(2) In the foregoing embodiments, the polarizing film F is joined to one surface of the liquid crystal panel W. The polarizing films F may be joined simultaneously to opposite surfaces of the liquid crystal panel W. For instance, as shown in FIG. 10, addition is made of a cutting section where the polarizing film F is supplied that is joined to the rear face of the liquid crystal panel W. Moreover, in the joining section, a transport path is arranged with a separating mechanism 18 for the rear face below the transport path for the liquid crystal panel W. Accordingly, simultaneous joining may be realized. Here, in this embodiment, the following configuration is adopted. After separating the separator S on the rear face of the polarizing film F, a reversal robot 40 suction-holds the surface of the polarizing film F. The polarizing film F is placed on a mounting table 41 having a recess formed therein at a tip end of the robot that is capable of retracting such that the joining rear face thereof is directed upward. In this state, the polarizing film F is pushed on the transport belt to convey it to from the transport belt to the suction table 32.

In this configuration, both cutting sections differ from each other in incidence of fracture. Accordingly, the controller 9 adjusts the processing speed into the higher actual incidence.

With this configuration, the polarizing films F may be joined to opposite surfaces of the liquid crystal panel W, which results in improved working efficiency than that in case of joining to one surface thereof.

(3) In the foregoing embodiment, the separator S is applied to the polarizing film F to be supplied. The polarizing film F with no separator S applied thereon is also applicable.

(4) In the cutting section in the foregoing embodiments, the film supply portion 1 temporarily stops supplying when cutting the polarizing film F. The following configuration may also be adopted. That is, the dancer roller may be placed in front of the cutting mechanism 3 so as to accommodate the feed amount of the polarizing film F fed out in the cutting section for preventing the polarizing film F from being supplied to the cutting section.

(5) In the cutting step in the foregoing embodiments, the laser device 11 is used for cutting the polarizing film F. A cutter, such as a cutter blade and a pressing cutter may be utilized instead of the laser device. In this case, the configuration may be modified having a mechanism to move the tip end of the cutter blade to the cutting operation position, the retracting position, and a width direction of the polarizing film F.

(6) In the foregoing embodiments, supply may be performed with the master roll that winds up the polarizing film F with no need for appearance inspection in the cutting section. For instance, the appearance inspection is conducted prior to winding up of the polarizing film F to the bobbin. Positional information on adhesion of contamination or existence of fracture, etc., stored in a two-dimension code is applied to each of the master rolls. In use of the master roll, positional information is read from the two-dimension code, and a rotary encoder detects a position of the read positional information. Then, the fracture is cut and removed based on the detected result. With this configuration, an appearance inspection process may be omitted, which results in a simplified apparatus configuration.

(7) In the foregoing embodiments, the polarizing film F with the fracture is cut by the minimum length for removal and collection in the cutting section. The polarizing film F may be removed and collected in another section. For instance, the polarizing film F is cut in the same size as a product size to be housed in a stack manner at an interval in the cassette with a front face opening. The tip end of the robot arm with a chuck function is inserted into a gap in the cassette for pulling out the polarizing film F in the joining section in a loading region. The fracture is distinguished and removed prior to delivering of the polarizing film F to the separating mechanism 18.

Positional information when housing the polarizing film F to the cassette in the cutting section may be sent to the joining section for use in distinction of the defect. Moreover, when or after pulling out the defective polarizing film F with a mark or a two-dimension code applied thereron from the cassette, an optical sensor may detect and determine these marks.

In addition, another embodiment may be adopted having the following configuration. Likewise, the defective polarizing film F has the same size as the product size as above, whereby suction in the defective on the transport belt is partially released before reaching to the joining mechanism 21. The polarizing film F is sucked from above with the chuck-type transport mechanism, and removed in the collecting position.

(8) In each of the foregoing embodiments, all the polarizing films F are pulled out from the container 5 already loaded in the joining section, and simultaneously a new container 5 with the polarizing film F housed therein is loaded from the previous section. The loading is not necessarily performed simultaneously. For instance, a turntable is arranged on the uppermost stream of the joining section in which two or more containers 5 may be placed. By turning the turntable, the container 5 having the polarizing films F housed therein moves to the optical member pulling out position, and an empty container moves to the unloading region. In other words, two or more containers 5 having the polarizing films F housed therein may be stocked before the container 5 loaded in the optical member pulling out position is empty.

INDUSTRIAL UTILITY

As described above, this invention is suitable for efficiently joining an optical member to a liquid crystal panel.

The invention claimed is:

1. An optical member joining method for joining an optical member to a liquid crystal panel, comprising the steps of:
    feeding out the strip-shaped optical member, and cutting the optical member at a given distance in a transportation direction for housing thereof into a container;
    unloading the container with the optical member housed therein and loading an empty container to the cutting section; and
    pulling out and transporting the optical member from an unloading region of the container with the optical member housed therein, and joining the optical member to at least one surface of the liquid crystal panel in a given joining position, in the joining step, at least one of the containers with the optical member housed therein being loaded to a joining section prior to pulling out of all the optical members from the container.

2. The optical member joining method according to claim 1, wherein
    all the optical members housed in the container are pulled out and the empty container is unloaded in the joining step, and simultaneously, the container with the cut optical members housed therein in the cutting step is loaded to an optical member pulling out position at the unloading region.

3. The optical member joining method according to claim 1, wherein
    the cutting step further comprises detecting of a fracture in the optical member and cutting and removing the fracture.

4. The optical member joining method according to claim 1, wherein
    a timing of unloading the empty container from the joining section and a timing of loading the container with the optical members housed therein is controlled by
    determining a temporary unit time for pulling out all the optical members from inside of the container in the joining step; and
    controlling a processing time from cutting and housing of the optical member fed out from the master roll in the cutting section by a given number to loading of the container to the optical member pulling out position as the unloading region.

5. The optical member joining method according to claim 4, wherein
    the processing time is controlled by calculating in advance a reference incidence of fracture in the strip-shaped optical member having a given length and determining a shortest time required for cutting and removing the fracture and for housing the optical members in the container; and
    controlling at least one of a carrying speed of the optical member, a housing speed of the optical member, and a loading speed of the container within a remaining period of time that is given by subtracting the shortest time from the unit time in the joining step.

6. The optical member joining method according to claim 5, wherein
    in the inspecting step, the reference incidence of fracture determined in advance is compared with an actual incidence of fracture as a ratio of the fracture determined in sequence in the strip-shaped optical member of a given length, and where the actual incidence exceeds the reference incidence, at least one of the carrying speed of the optical member, the housing speed of the optical member, the loading speed of the container, and the fracture removal speed reaches a limiting value in the cutting step, and the loading time to the optical member pulling out position exceeds the unit time, the carrying speed of the optical member in the joining section is controlled such that the unit time is equal to the loading time.

7. An optical member joining method for joining an optical member to a liquid crystal panel, comprising the steps of:
    feeding out the strip-shaped optical member having a separator, cutting the optical member at a given distance in a transportation direction, and housing the optical member into a container;
    unloading the container with the optical member housed therein and loading an empty container to the cutting section; and
    pulling out the optical member from an unloading region of the container with optical members housed therein and separating the separator,
    and joining the optical member with the separator separated therefrom to at least one surface of the liquid crystal panel in a given joining position,
    in the separating step, at least one of the containers with the optical member housed therein being loaded from the cutting step to the separation step before all the optical members are pulled out from the container.

8. The optical member joining method according to claim 7, wherein
    all the optical members housed in the container are pulled out and the empty container is unloaded in the separating step, and simultaneously, the container with the cut optical members housed therein in the cutting step is loaded to an optical member pulling out position at an unloading region.

9. The optical member joining method according to claim 7, wherein
    the cutting step comprises
    separating of the separator from the optical member;
    detecting of a fracture in the optical member with the separator separated therefrom;
    joining of a separator to the optical member subject to detection; and
    cutting and removing of the fracture.

10. The optical member joining method according to claim 7, wherein
    a timing of unloading the empty container from the joining section and a timing of loading the container with the optical members housed therein is controlled by
    determining a temporary unit time for pulling out all the optical members from inside of the container in the separating step, and
    controlling a processing time from cutting of the optical member in the cutting step to be housed by a given number to loading of the container to the optical member pulling out position at an unloading region.

11. The optical member joining method according to claim 10, wherein
    the processing time is controlled by
    calculating in advance a reference incidence of fracture in the strip-shaped optical member having a given length and determining a shortest time required for cutting and removing the fracture; and controlling at least one of a carrying speed of the optical member, a housing speed of the optical member, and a loading speed of the container within a remaining period of time that is given by subtracting the shortest time from the unit time in the joining step.

12. The optical member joining method according to claim 11, wherein in the detecting step, the reference incidence of fracture determined in advance is compared with an actual incidence of fracture determined in sequence, and where the actual incidence exceeds the reference incidence, at least one of the carrying speed of the optical member, the housing speed of the optical member, the loading speed of the container, the joining speed of the separator, and the fracture removal speed reaches a limiting value in the cutting step, and the loading time to the optical member pulling out position exceeds the unit time, the carrying speed of the optical member in the joining step is controlled such that the unit time is equal to the loading time.

13. An optical member joining apparatus that joins an optical member to a liquid crystal panel, comprising:

an optical member supply device that feeds out and supplies a strip-shaped optical member;

a cutting device that cuts the optical member at a given distance in a feeding direction;

a container that houses cut optical members;

a housing device that houses the cut optical members into the container;

a loading device that loads the container to an optical member pulling out position where the optical member is joined to the liquid crystal panel;

a carrying mechanism that pulls out the optical member from the container;

a joining device that joins the optical member carried and transported with the carrying mechanism to the liquid crystal panel;

an unloading device that unloads an empty container from which the optical members are pulled out with the carrying mechanism; and a control device that controls at least one of a carrying speed of the optical member from the optical member supply device, a housing speed that houses the optical member into the container with the housing device, and a loading speed of the container with the loading device such that the container with the cut optical members housed therein is loaded to the optical member pulling out position at the same time that all the optical members are pulled out from the container loaded into the optical member pulling out position and the empty container is unloaded.

14. The optical member joining apparatus according to claim 13, wherein the control device controls each of the processing speeds by determining a temporary unit time for pulling out all the optical members from inside of the container in the joining section, and controlling either of the processing speeds such that a time from cutting of the optical member to be housed by a given number to loading of the container to the optical member pulling out position as the unloading region is equal to the unit time.

15. The optical member joining apparatus according to claim 14, wherein the processing time is controlled by calculating in advance a reference incidence of fracture in the strip-shaped optical member having a given length and determining a shortest time required for cutting and removing the fracture; and controlling at least one of a carrying speed of the optical member, a housing speed of the optical member, and a loading speed of the container within a remaining period of time that is given by subtracting the shortest time from the unit time in the joining step.

16. The optical member joining apparatus according to claim 15, comprising an inspection device that detects fracture in the optical member prior to cutting of the optical member with the cutting device to compare an actual incidence determined in sequence with the reference incidence; and a fracture removal device that cuts the fracture, wherein, where the actual incidence determined with the inspection device exceeds the reference incidence, at least one of the carrying speed of the optical member, the housing speed of the optical member, and the loading speed of the container, and the fracture removal speed reaches a limiting value in the cutting step, and the loading time to the optical member pulling out position exceeds the unit time, the control device controls the carrying speed of the carrying mechanism and that of the optical member after unloading such that the unit time is equal to the loading time.

17. An optical member joining apparatus that joins an optical member to a liquid crystal panel, comprising:

an optical member supply device that feeds out and supplies a strip-shaped optical member having a separator;

a cutting device that cuts the optical member at a given distance in a feeding direction;

a container that houses cut optical members;

a housing device that houses the cut optical members into the container;

a loading device that loads the container to an optical member pulling out position where the optical member is joined to the liquid crystal panel;

a carrying mechanism that carries the optical member from the container;

a separating device that separates the separator from the optical member pulled out and unloaded by the unloading mechanism;

a joining device that joins the optical member with the separator separated therefrom to the liquid crystal panel;

an unloading device that unloads an empty container from which the optical members are carried with the carrying mechanism; and a control device that controls at least one of a carrying speed of the optical member from the optical member supply device, a housing speed that houses the optical member into the container with the housing device, and a loading speed of the container with the loading device such that the container with the cut optical members housed therein is loaded to the optical member pulling out position at the same time that all the optical members are carried from the container loaded into the optical member pulling out position and the empty container is unloaded.

18. The optical member joining apparatus according to claim 17, wherein the control device controls each of the processing speeds by determining a temporary unit time for pulling out all the optical members from inside of the container in the joining section, and controlling either of the processing speeds such that a time from cutting of the optical member to be housed by a given number to loading of the container to the optical member pulling out position as the unloading region is equal to the unit time.

19. The optical member joining apparatus according to claim 18, wherein the processing time is controlled by calculating in advance a reference incidence of fracture in the strip-shaped optical member having a given length and determining a shortest time required for cutting and removing the fracture; and controlling at least one of a carrying speed of the optical member, a housing speed of the optical member, and a loading speed of the container within a remaining period of time that is given by subtracting the shortest time from the unit time in the joining step.

20. The optical member joining apparatus according to claim 17, comprising a separating device that separates the separator from the optical member prior to cutting of the optical member with the cutting device;

an inspection device that detects fracture in the optical member with the separator separated therefrom to compare an actual incidence determined in sequence with the reference incidence;

a joining device that joins a separator to the optical member subjected to the inspection; and a fracture removal device that cuts the fracture detected by the inspection device with the cutting device for removing the fracture, wherein, where the actual incidence determined with the inspection device exceeds the reference incidence, at least one of the carrying speed of the optical member, the housing speed of the optical member, and the loading speed of the container, the joining speed of the separator, and the fracture removal speed reaches a limiting value in the cutting step, and the loading time to the optical member pulling out position exceeds the unit time, the control device controls the carrying speed of the carrying mechanism and that of the optical member after unloading is controlled such that the unit time is equal to the loading time.

* * * * *